US012791035B2

(12) United States Patent
Chen et al.

(10) Patent No.: US 12,791,035 B2
(45) Date of Patent: Nov. 10, 2026

(54) HIGH-PROTECTION EXTERNAL ROTOR AXIAL FLOW FAN

(71) Applicant: Zhongshan EBS Technology Co., Ltd., Zhongshan (CN)

(72) Inventors: Wangming Chen, Zhongshan (CN); Xuanfeng Wen, Zhongshan (CN)

(73) Assignee: ZHONGSHAN EBS TECHNOLOGY CO., LTD., Zhongshan (CN)

( * ) Notice: Subject to any disclaimer, the term of this patent is extended or adjusted under 35 U.S.C. 154(b) by 0 days.

(21) Appl. No.: 19/399,553

(22) Filed: Nov. 24, 2025

(65) Prior Publication Data

US 2026/0258809 A1 Sep. 3, 2026

(30) Foreign Application Priority Data

Feb. 28, 2025 (CN) ......................... 202520348334.1

(51) Int. Cl.
*F04D 29/08* (2006.01)
*F04D 19/00* (2006.01)
*F04D 29/056* (2006.01)
*H02K 5/10* (2006.01)
*H02K 5/173* (2006.01)

(52) U.S. Cl.
CPC ......... *F04D 29/083* (2013.01); *F04D 19/002* (2013.01); *F04D 29/056* (2013.01); *H02K 5/10* (2013.01); *H02K 5/1735* (2013.01)

(58) Field of Classification Search
CPC .... F04D 29/083; F04D 19/002; F04D 29/056; F04D 29/703; H02K 5/10; H02K 5/1735
See application file for complete search history.

(56) References Cited

U.S. PATENT DOCUMENTS 5,586,871 A * 12/1996 Barnes .................. F04D 29/083 415/173.7
11,764,635 B2 * 9/2023 Eason .................. H02K 5/1732 310/88
2015/0247649 A1 * 9/2015 Tanikawa .................. F24F 1/46 62/298

FOREIGN PATENT DOCUMENTS

| | | | | | |
|---|---|---|---|---|---|
| CN | 202273884 | U | * | 6/2012 | |
| CN | 102454642 | B | * | 12/2014 | F04D 29/326 |
| CN | 205123466 | U | * | 3/2016 | H02K 5/10 |
| CN | 109185198 | A | * | 1/2019 | F04D 25/08 |
| JP | 2001248736 | A | * | 9/2001 | |

* cited by examiner

*Primary Examiner* — Eldon T Brockman
(74) *Attorney, Agent, or Firm* — MATTHIAS SCHOLL P.C.; Matthias Scholl

(57) ABSTRACT

An axial flow fan including an external rotor motor and an impeller. The external rotor motor includes a base, an external rotor assembly, a rotating shaft, and a stator assembly. The base includes a base plate and a sleeve; bearing chambers are respectively disposed at both ends of the sleeve, and bearings are disposed within the bearing chambers. The rotating shaft is rotatably supported by the bearings, and a top end of the rotating shaft is connected to the external rotor assembly. The stator assembly is disposed around the sleeve and is disposed within an inner cavity of the external rotor assembly; an annular protrusion is disposed at an edge of the base plate. A labyrinth seal structure is formed by a complementary engagement of convex and concave structures between the annular protrusion and an end of the external rotor assembly.

14 Claims, 12 Drawing Sheets

HIGH-PROTECTION EXTERNAL ROTOR AXIAL FLOW FAN

CROSS-REFERENCE TO RELATED APPLICATIONS

Pursuant to 35 U.S.C.§ 119 and the Paris Convention Treaty, this application claims foreign priority to Chinese Patent Application No. 202520348334.1 filed Feb. 28, 2025, the contents of which, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, MA 02142.

BACKGROUND

The disclosure relates to a high-protection external rotor axial flow fan.

Due to their structural characteristics, traditional external rotor fans and motors inherently possess limitations in sealing performance compared to internal rotor fans and motors. These inherent sealing deficiencies prevent their application in outdoor and special environments, consequently limiting the utilization of their advantages such as compact structure, high starting torque, excellent balance, and high level of integration. While waterproofing measures are implemented between the rotor and the end cover in external rotor motors, the necessary gap to ensure free rotation of the rotor restricts the effectiveness of these waterproofing measures. Typically, the maximum protection rating achievable is only up to Ingress Protection Rating 54 (IP54).

Traditional external rotor fans are widely used in ventilation and refrigeration equipment across environments such as energy storage, chemical, pharmaceutical, and metallurgical industries, as well as in cooling towers, air-cooled condensers, and air-cooled heat exchangers. However, these ventilation and refrigeration equipment often operate under harsh conditions involving high humidity, water vapor, and corrosive gases. Due to their inferior sealing performance compared to internal rotor fans and motors, the service life of these products is relatively insufficient, making large-scale promotion difficult.

A structural analysis of traditional external rotor fans and motors, as illustrated in FIG. 1, reveals that water ingress primarily occurs through two main paths: the motor bearing chamber and the gap between the motor stator and rotor. Particularly during outdoor operation, most can only achieve a waterproof rating of IP54. When water enters the internal components of the motor through the stator-rotor gap of the axial flow fan, it affects the internal windings and electrical components.

Moisture can cause the windings to become damp, degrading their insulation performance. For instance, in humid environments, the insulation resistance of motor windings may drop from the normal range of several megohms to just a few thousand ohms or even lower. This can lead to short-circuit faults within the motor. Once a short circuit occurs, the motor's current increases sharply, generating excessive heat that can burn out the motor.

Additionally, the motor's bearings can be damaged by water ingress. Impurities in the water can enter the bearing interior, degrading the lubricating performance and increasing friction. Prolonged friction accelerates bearing wear, causing abnormal vibration and noise, and ultimately leading to motor failure.

SUMMARY

The disclosure provides an axial flow fan, comprising an external rotor motor and an impeller. The external rotor motor comprises a base, an external rotor assembly, a rotating shaft, and a stator assembly; the base comprises a base plate and a sleeve protruding upward from a middle of a top surface of the base plate; bearing chambers are respectively disposed at both ends of the sleeve, and bearings are disposed within the bearing chambers; the rotating shaft is rotatably supported by the bearings, and a top end of the rotating shaft is connected to the external rotor assembly; the stator assembly is disposed around the sleeve and is disposed within an inner cavity of the external rotor assembly; an annular protrusion is disposed at an edge of the base plate; a labyrinth seal structure is formed by a complementary engagement of convex and concave structures between the annular protrusion and an end of the external rotor assembly; the impeller comprises a plurality of blades and a hub; the plurality of blades are mounted on an outer side of the hub, and the hub is disposed around the external rotor assembly; an external water baffle ring is disposed around the base; a periphery of the external water baffle ring is inclined and extends radially outward to a position above the hub; and the external water baffle ring cooperates with the hub to form a water blocking device around a periphery of the labyrinth seal structure.

In a class of this embodiment, the external water baffle ring comprises a mounting portion and a baffle portion; the mounting portion is disposed around the base; the baffle portion is connected to the mounting portion and extends radially to be positioned above the hub; an outer side of the baffle portion is inclined downward and forms a gap opening with a top outer edge of the hub; the baffle portion extends downward to form a first inner baffle, and the first inner baffle is adjacent to and shields the gap opening.

In a class of this embodiment, the hub is mounted to an outer end of the external rotor assembly via an installation bracket; the installation bracket is equipped with an internal water baffle ring; and the internal water baffle ring is located radially inward of the first inner baffle.

In a class of this embodiment, the baffle portion further extends downward to form a second inner baffle; the first inner baffle and the second inner baffle are spaced apart from each other; the second inner baffle is located radially inward of the first inner baffle; and a top portion of the internal water baffle ring is nested within a groove formed between the first inner baffle and the second inner baffle.

In a class of this embodiment, a cross-section of the internal water baffle ring is U-shaped, I-shaped, L-shaped, or J-shaped.

In a class of this embodiment, an outer diameter of the baffle portion is slightly greater than an outer diameter of the hub.

In a class of this embodiment, the annular protrusion comprises a first groove and a first boss; the end of the external rotor assembly comprises a second groove and a second boss; the first boss is engaged in the second groove, and the second boss is engaged in the first groove, thereby forming the labyrinth seal structure.

In a class of this embodiment, the base is disposed on a protective grill by a plurality of screws.

In another aspect, the disclosure also provides an axial flow fan, comprising an external rotor motor and an impeller. The external rotor motor comprises a base, an external rotor assembly, a rotating shaft, and a stator assembly; the base comprises a base plate and a sleeve protruding upward from a middle of a top surface of the base plate; bearing chambers are respectively disposed at both ends of the sleeve, and bearings are disposed within the bearing chambers; the rotating shaft is rotatably supported by the bearings, and a top end of the rotating shaft is connected to the external rotor assembly; the stator assembly is disposed around the sleeve and is disposed within an inner cavity of the external rotor assembly; an annular protrusion is disposed at an edge of the base plate; a labyrinth seal structure is formed by a complementary engagement of convex and concave structures between the annular protrusion and an end of the external rotor assembly; the impeller comprises a plurality of blades and a hub; the plurality of blades are mounted on an outer side of the hub, and the hub is mounted to an outer end of the external rotor assembly via an installation bracket; an external water baffle ring is disposed around the base; the installation bracket is equipped with an internal water baffle ring; and the external water baffle ring cooperates with the internal water baffle ring to form a water blocking device around a periphery of the labyrinth seal structure.

In a class of this embodiment, a top of the internal water baffle ring is positioned adjacent to and below the external water baffle ring; and a gap is formed between a bottom surface of the external water baffle ring and the top of the internal water baffle ring.

In a class of this embodiment, a cross-section of the internal water baffle ring is U-shaped or L-shaped; and a cross-section of the external water baffle ring is rectangular.

The following advantages are associated with the external rotor axial flow fan of the disclosure.

1. The axial flow fan features an annular protrusion disposed at the edge of the base plate of the base. A labyrinth seal structure is formed at the junction between the annular protrusion and the end portion of the external rotor assembly through a complementary engagement of convex and concave structures. A water blocking device is formed around the periphery of the labyrinth seal structure. Compared to existing structures, this design can improve the waterproof rating by 1 to 3 levels, achieving a maximum protection rating of IP66 for water and dust ingress. It effectively prevents frequent failures caused by water entering the motor's interior and degrading its insulation performance, while also providing effective protection for the bearings. This results in a significant increase in reliability and a substantial reduction in the failure rate.

2. The axial flow fan features superior protection performance. The high-protection axial flow fan typically achieves a high ingress protection rating, enabling it to completely prevent the intrusion of foreign objects and dust, and to operate normally even when exposed to water jets. This signifies that the high-protection axial flow fan can effectively resist dust and impurities present in the operating environment of energy storage systems, preventing them from entering the fan's interior and damaging critical components such as the motor and impeller. For energy storage facilities in coastal areas or energy storage systems within chemical plants, the air may contain salt or corrosive chemicals. The housing and internal components of the high-protection axial flow fan undergo special anti-corrosion treatment, enabling them to resist erosion from these corrosive substances. This prolongs the service life of the fan and facilitates its broader application.

3. The fan is adaptable to various installation environments. Energy storage facilities are installed in diverse locations and conditions, potentially indoors, outdoors, underground, and other sites. By virtue of its high protection performance, the high-protection axial flow fan can flexibly adapt to these varied installation environments. Whether mounted on top of an outdoor energy storage container or beside an indoor energy storage battery rack, it performs effectively. For instance, when installed outdoors, it can withstand harsh weather conditions such as rain, wind, and dust. When installed indoors, it maintains normal operation even in damp or dusty environments, thereby providing stable ventilation conditions for the energy storage system.

4. The fan offers high safety and reliability. The energy storage industry imposes extremely high safety requirements on equipment. The superior sealing and robust housing structure of the high-protection axial flow fan prevent foreign objects from entering the fan's interior and causing electrical faults. For example, in energy storage environments containing flammable gases, preventing spark generation is crucial. The high-protection axial flow fan, through its effective motor protection and sealing, reduces the risk of spark generation caused by short circuits or friction. Furthermore, the high-protection axial flow fan generally undergoes rigorous quality testing and certification, such as compliance with relevant safety standards like UL (Underwriters Laboratories) and CE (Conformité Européenne), providing greater assurance in terms of safety. This is a significant advantage for safety-sensitive sectors like the energy storage industry.

5. Owing to the superior protection performance of the high-protection axial flow fan, the internal components of the motor are well protected, resulting in a relatively lower probability of failure. This translates to fewer instances of fan repair and replacement during the operation of the energy storage system, thereby decreasing labor costs for maintenance and expenses for equipment replacement.

Furthermore, its stable performance mitigates the risk of damage to energy storage equipment caused by overheating due to fan failure, indirectly lowering the repair and replacement costs for the energy storage devices. Overall, this leads to a reduction in the total operation and maintenance costs of the energy storage system.

DETAILED DESCRIPTION

Figure 1:
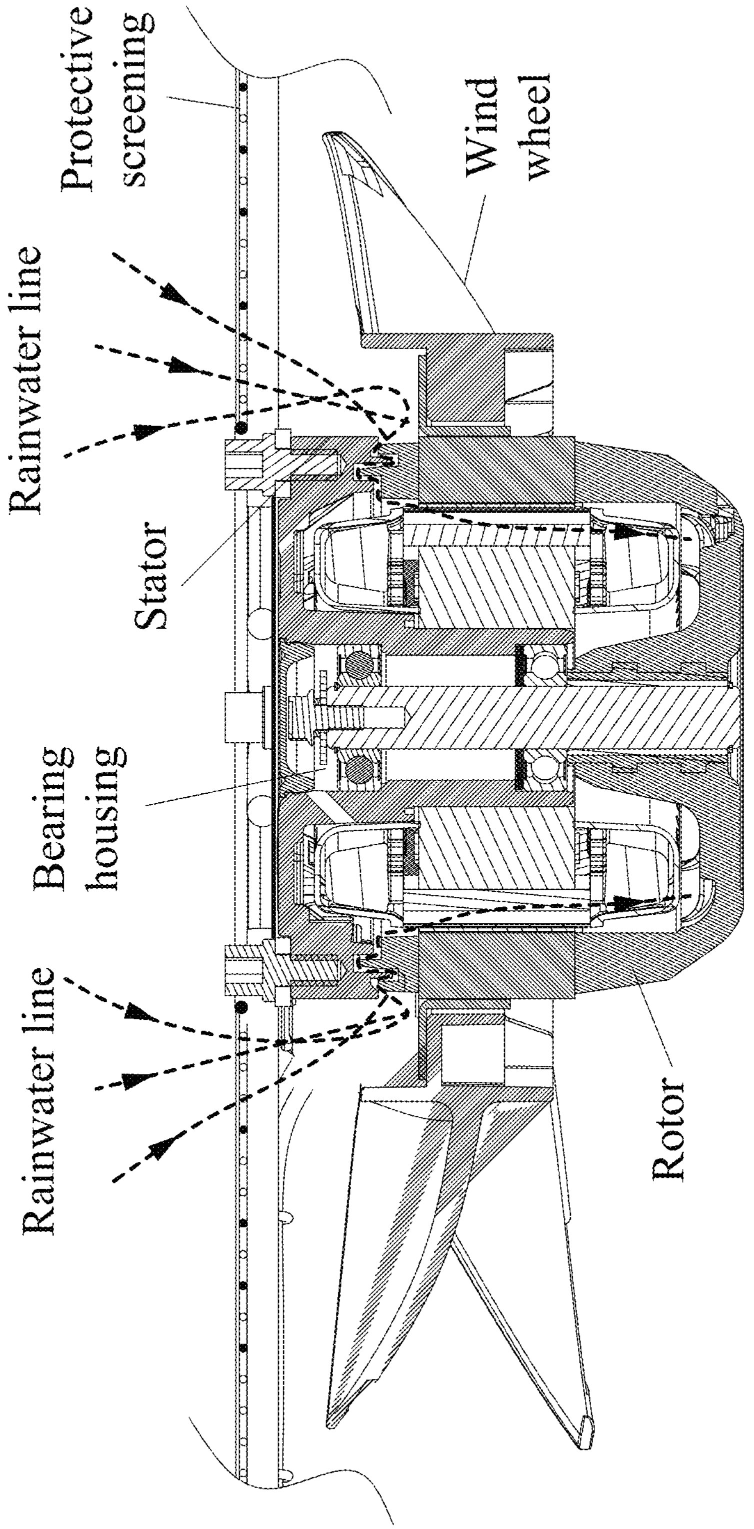
FIG. 1 (Prior art)
FIG. 1 is a diagram showing a water ingress path of an external rotor axial flow fan in the prior art.
Figure 2:
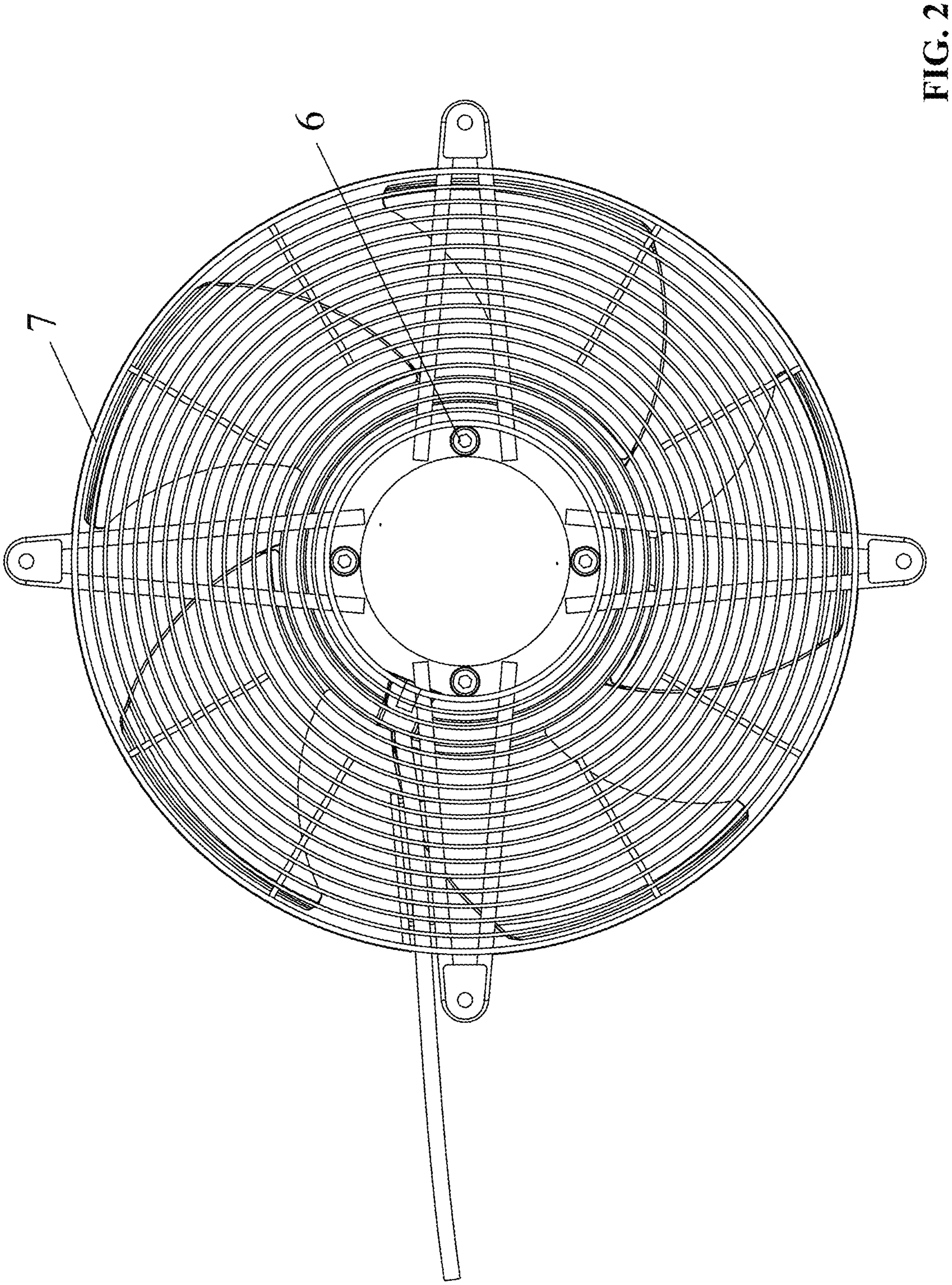
FIG. 2 is a top view of an external rotor axial flow fan according to Example 1 of the disclosure.
Figure 3:
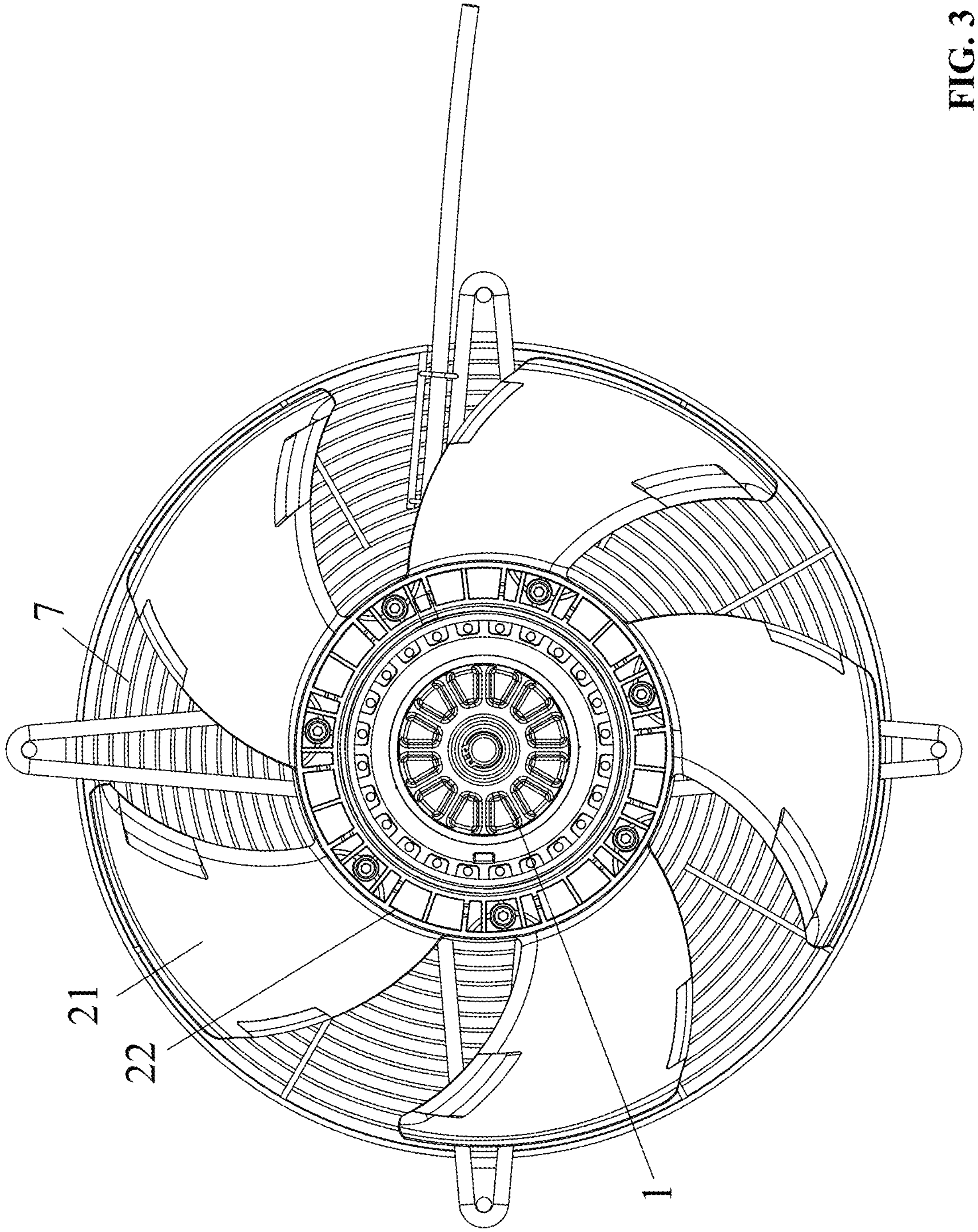
FIG. 3 is a bottom view of the external rotor axial flow fan according to Example 1 of the disclosure.
Figure 4:
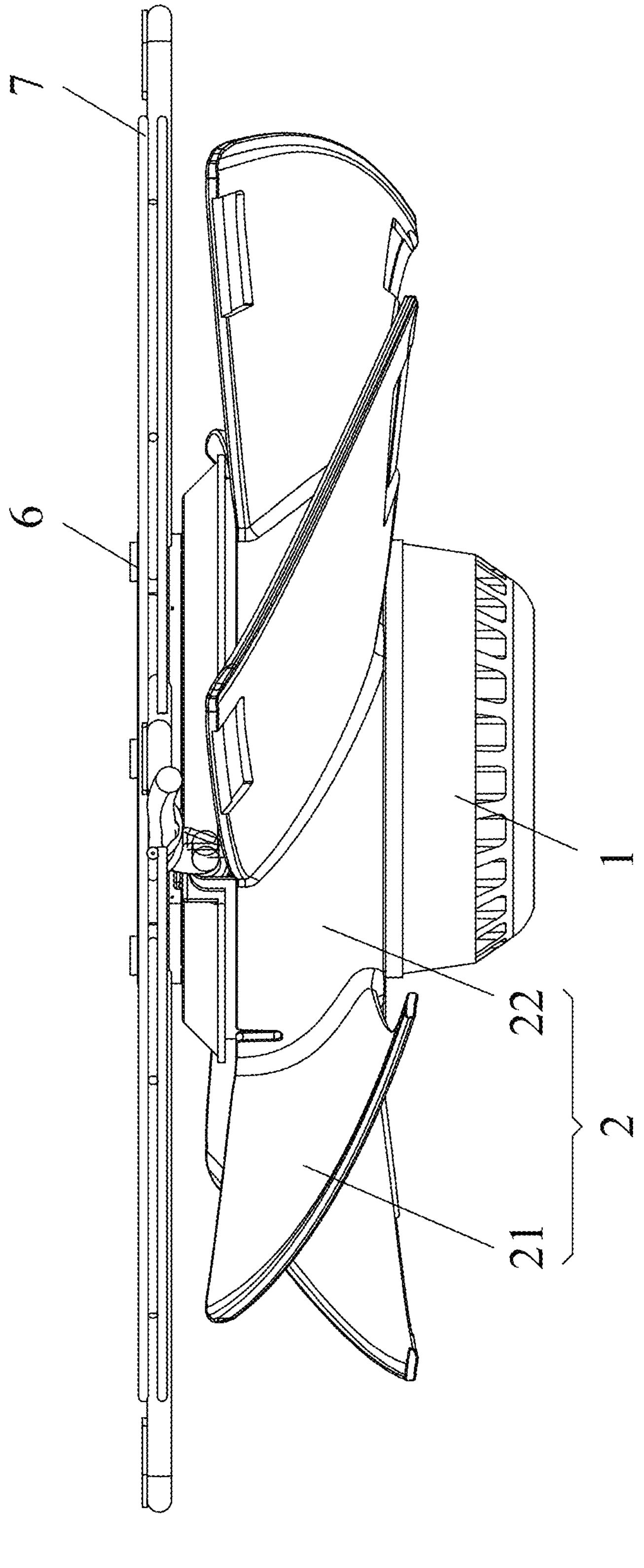
FIG. 4 is a side view of the external rotor axial flow fan according to Example 1 of the disclosure.
Figure 5:
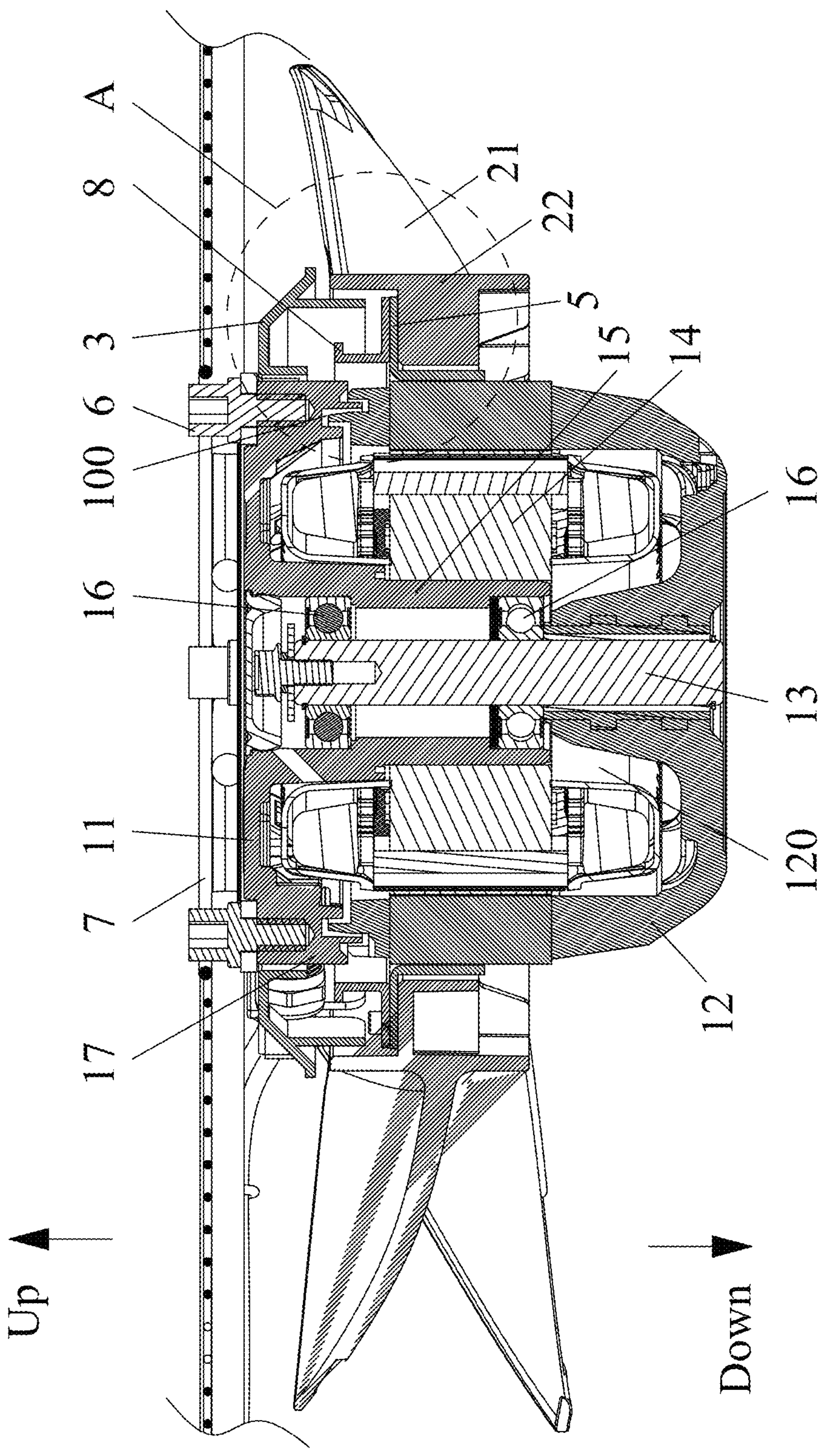
FIG. 5 is a structural cross-sectional view of the external rotor axial flow fan according to Example 1 of the disclosure.
Figure 6:
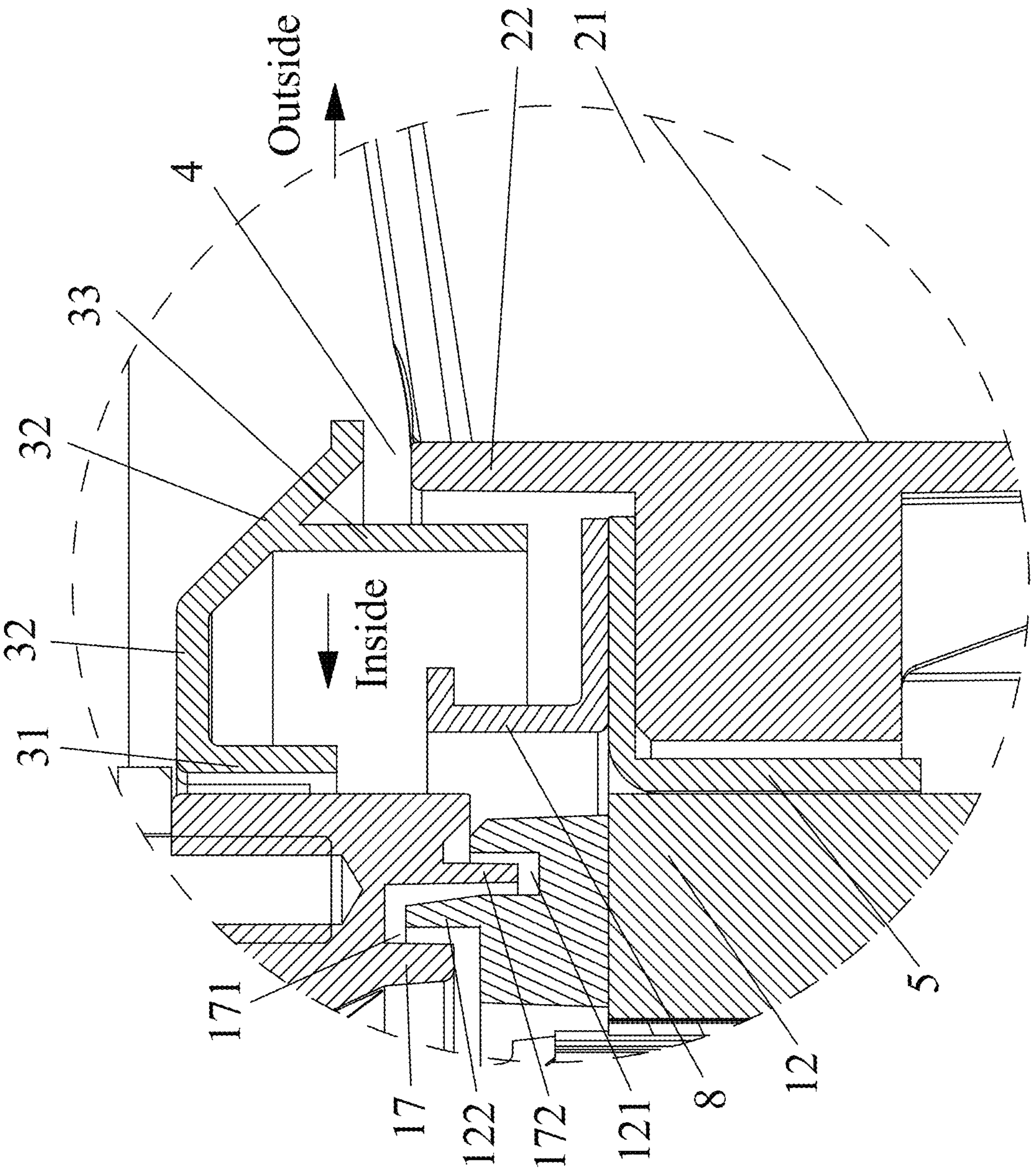
FIG. 6 is a partial enlarged view of part A of FIG. 5.

To further illustrate the disclosure, embodiments detailing an axial flow fan are described below. It should be noted that the following embodiments are intended to describe and not to limit the disclosure.

Example 1

As shown in FIGS. 2-7, the disclosure provides an axial flow fan, comprising an external rotor motor 1 and an impeller 2. The external rotor motor 1 comprises a base, an external rotor assembly 12, a rotating shaft 13, and a stator assembly 14; the base comprises a base plate 11 and a sleeve 15 protruding upward from a middle of a top surface of the base plate 11; bearing chambers are respectively disposed at both ends of the sleeve 15, and bearings 16 are disposed within the bearing chambers; the rotating shaft 13 is rotatably supported by the two bearings 16, and a top end of the rotating shaft 13 is connected to the external rotor assembly 12; the stator assembly 14 is disposed around the sleeve 15 and is located within an inner cavity 120 of the external rotor assembly 12; an annular protrusion 17 is disposed at an edge of the base plate 11; a labyrinth seal structure 100 is formed by a complementary engagement of convex and concave structures between the annular protrusion 17 and an end portion of the external rotor assembly 12; the impeller 2 comprises a plurality of blades 21 and a hub 22; the plurality of blades 21 are mounted on an outer side of the hub 22, and the hub 22 is disposed around the external rotor assembly 12; an external water baffle ring 3 is disposed around the base; a periphery of the external water baffle ring 3 is inclined and extends radially outward to a position above the hub 22; and the external water baffle ring 3 cooperates with the hub 22 to form a water blocking device around a periphery of the labyrinth seal structure 100.

Figure 7:
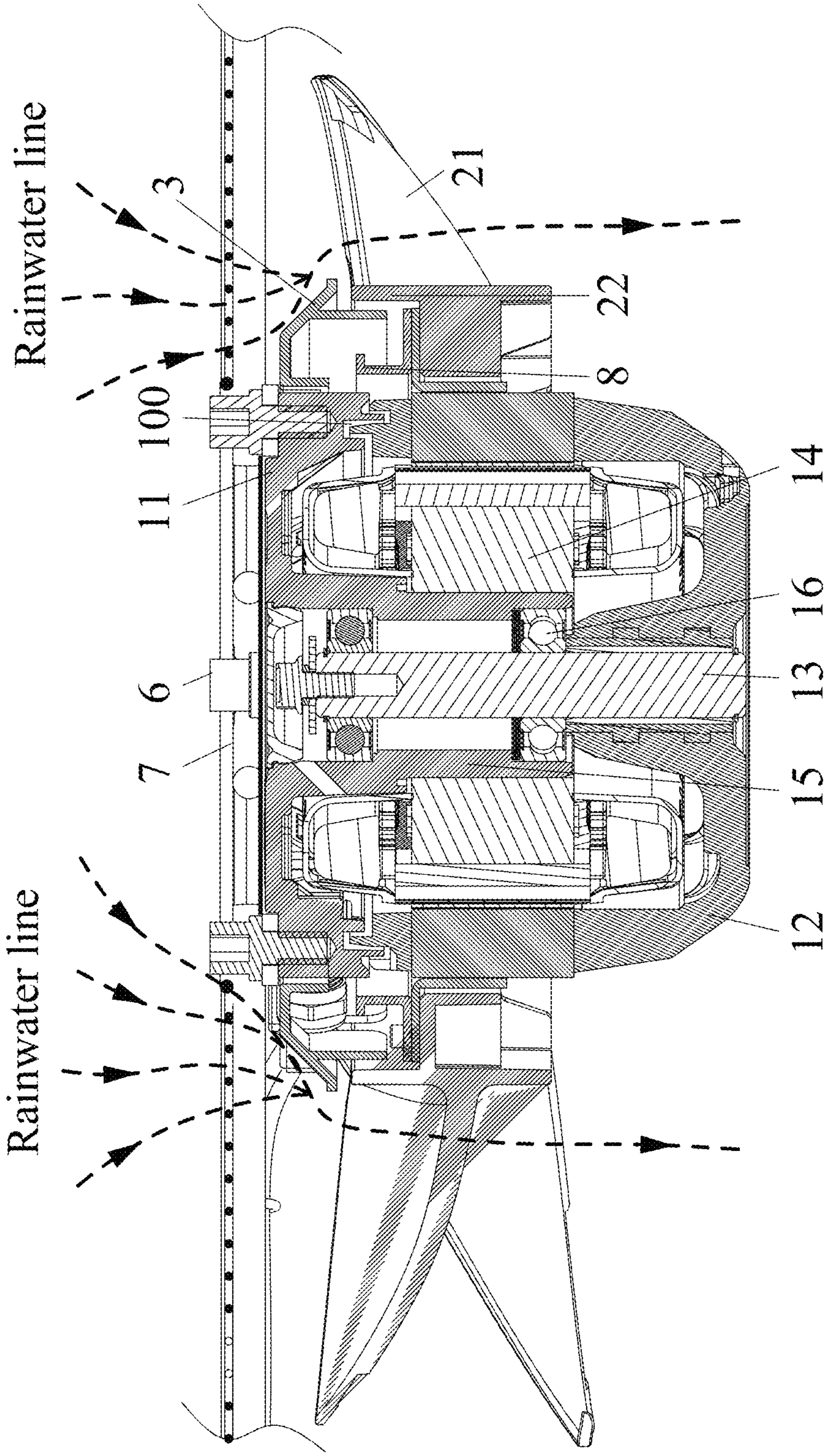
FIG. 7 is a water flow path diagram of the external rotor axial flow fan according to Example 1 of the disclosure.

As shown in FIG. 7, the external water baffle ring 3 disposed around the base. The periphery of the external water baffle ring 3 is inclined and extends to a position above the hub 22. The external water baffle ring 3 cooperates with the hub 22 to form a water blocking device around the periphery of the labyrinth seal structure 100. Compared to existing structures, this design can improve the waterproof rating by 1 to 3 levels, achieving a maximum protection rating of IP66 for water and dust ingress. This results in a significant increase in reliability and a substantial reduction in the failure rate. The fan offers superior protection performance, can adapt to various installation environments, and can effectively reduce operation and maintenance costs.

Furthermore, the external water baffle ring 3 comprises a mounting portion 31 and a baffle portion 32; the mounting portion 31 is disposed around the base; the baffle portion 32 is connected to the mounting portion 31 and extends radially to be positioned above the hub 22; an outer side of the baffle portion 32 is inclined downward and forms a gap opening 4 with a top outer edge of the hub 22; the baffle portion 32 extends downward to form a first inner baffle 33, and the first inner baffle 33 is adjacent to and shields the gap opening 4.

Preferably, the hub 22 is mounted to the outer end of the external rotor assembly 12 via an installation bracket 5. The installation bracket 5 is equipped with an internal water baffle ring 8, which is located radially inward of the first inner baffle 33. The cross-sectional shape of the internal water baffle ring 8 is J-shaped, and optionally it may be L-shaped or U-shaped. The addition of the internal water baffle ring 8 can further enhance the waterproof rating, improve the levels of water and dust protection, and significantly increase reliability.

Preferably, the outer diameter of the baffle portion 32 is slightly greater than the outer diameter of the hub 22, thereby causing water to be flung outward and minimizing water ingress into the gap opening 4, which enhances the waterproof rating and improves the levels of water and dust protection.

Preferably, the annular protrusion 17 comprises a first groove 171 and a first boss 172; the end of the external rotor assembly 12 comprises a second groove 121 and a second boss 122; the first boss 172 is engaged in the second groove 121, and the second boss 122 is engaged in the first groove 171, thereby forming the labyrinth seal structure 100.

Preferably, the base 11 is disposed on a protective grill 7 by a plurality of screws 6.

Example 2

Figure 8:
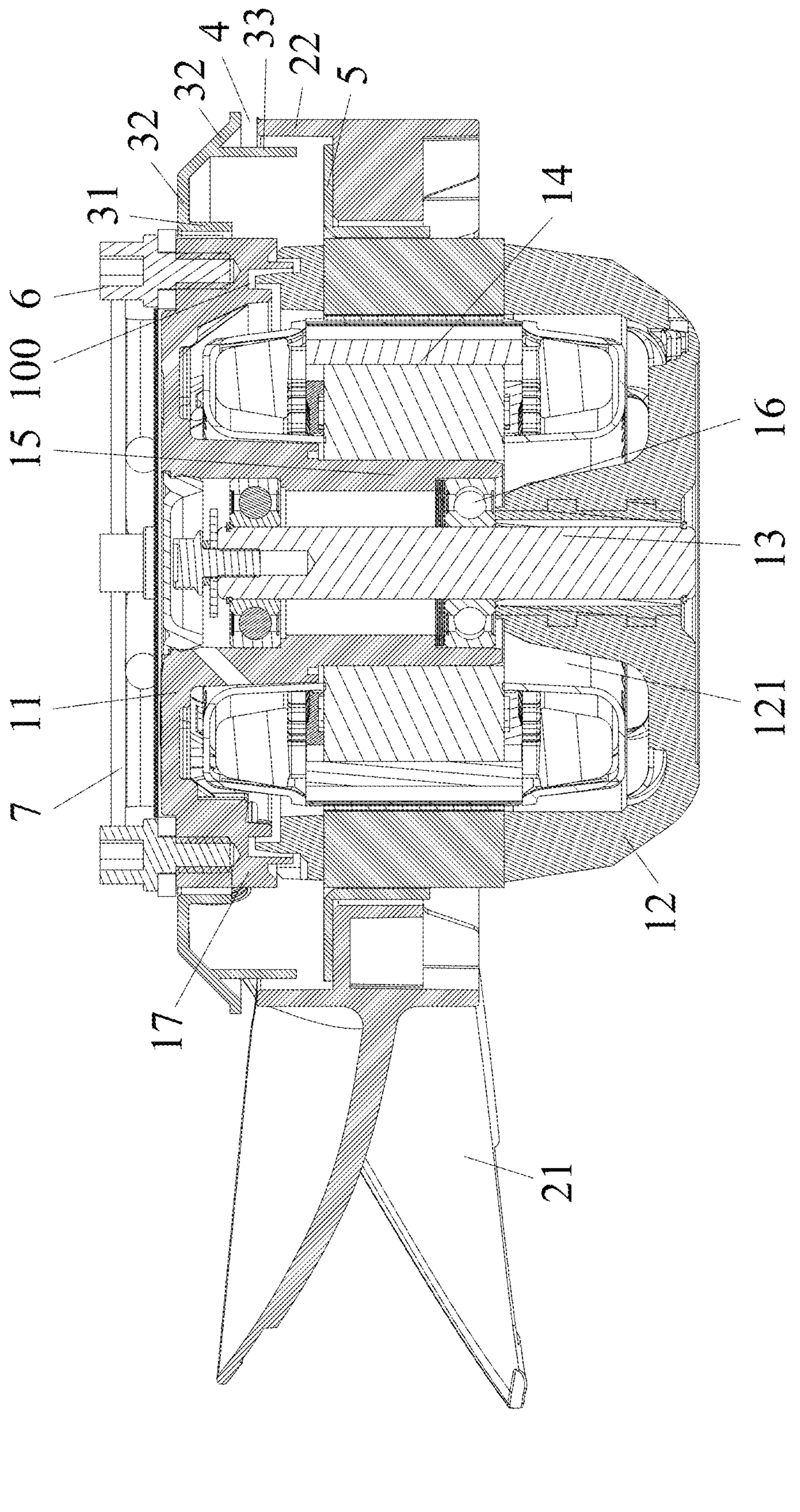
FIG. 8 is a structural cross-sectional view of an external rotor axial flow fan according to Example 2 of the disclosure.

As shown in FIG. 8, the present example is improved based on Example 1. To simplify the structure, the internal water baffle ring 8 from Example 1 is omitted. Although the waterproof and dustproof rating of Example 2 is slightly lower compared to that of Example 1, it remains sufficient for certain requirements.

Example 3

Figure 9:
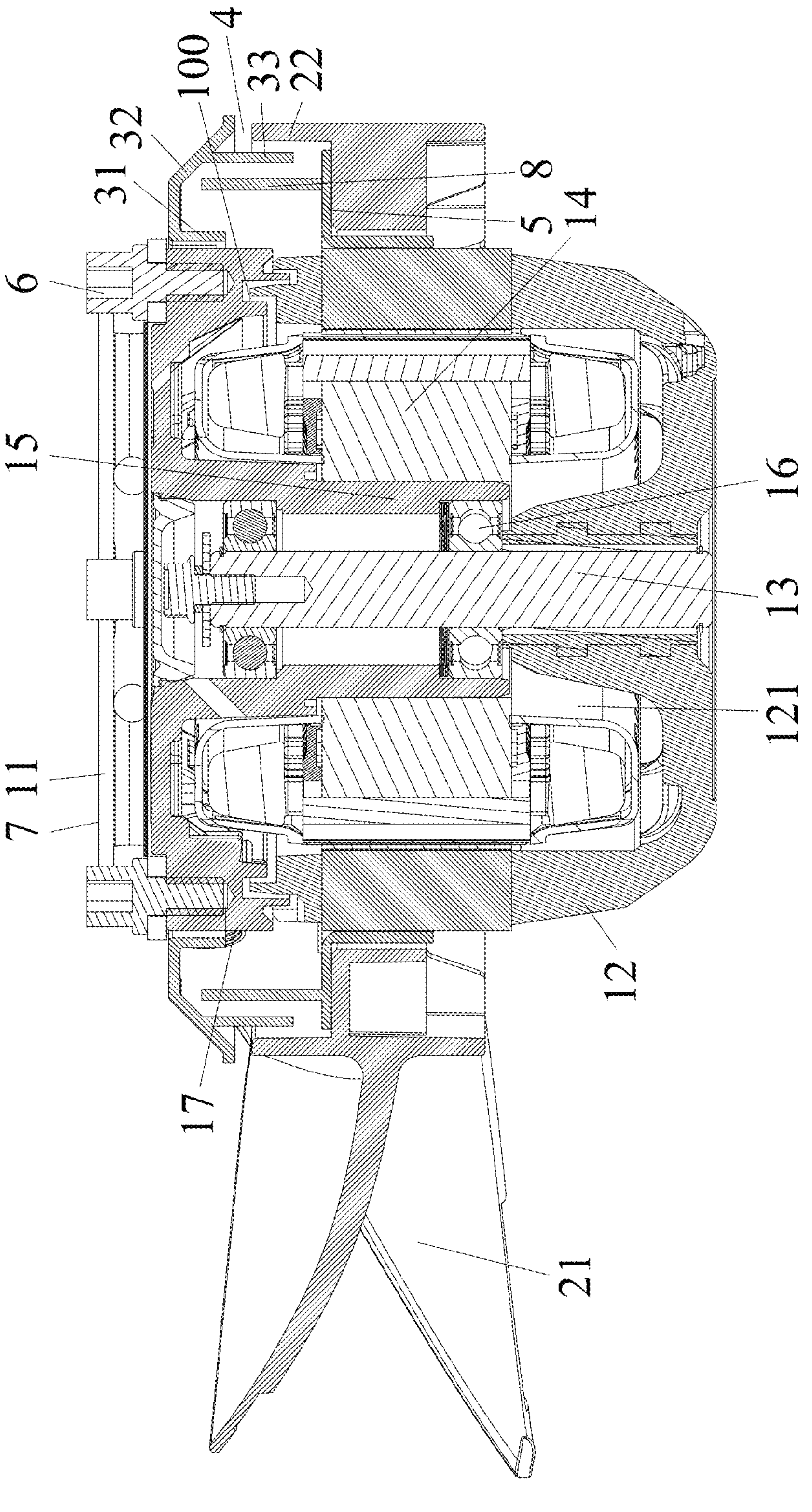
FIG. 9 is a structural cross-sectional view of an external rotor axial flow fan according to Example 3 of the disclosure.

As shown in FIG. 9, the present example is a modification based on Example 1. To simplify the structure, the cross-sectional shape of the internal water baffle ring 8 in Example 1 is altered to an upright rectangular shape.

Example 4

Figure 10:
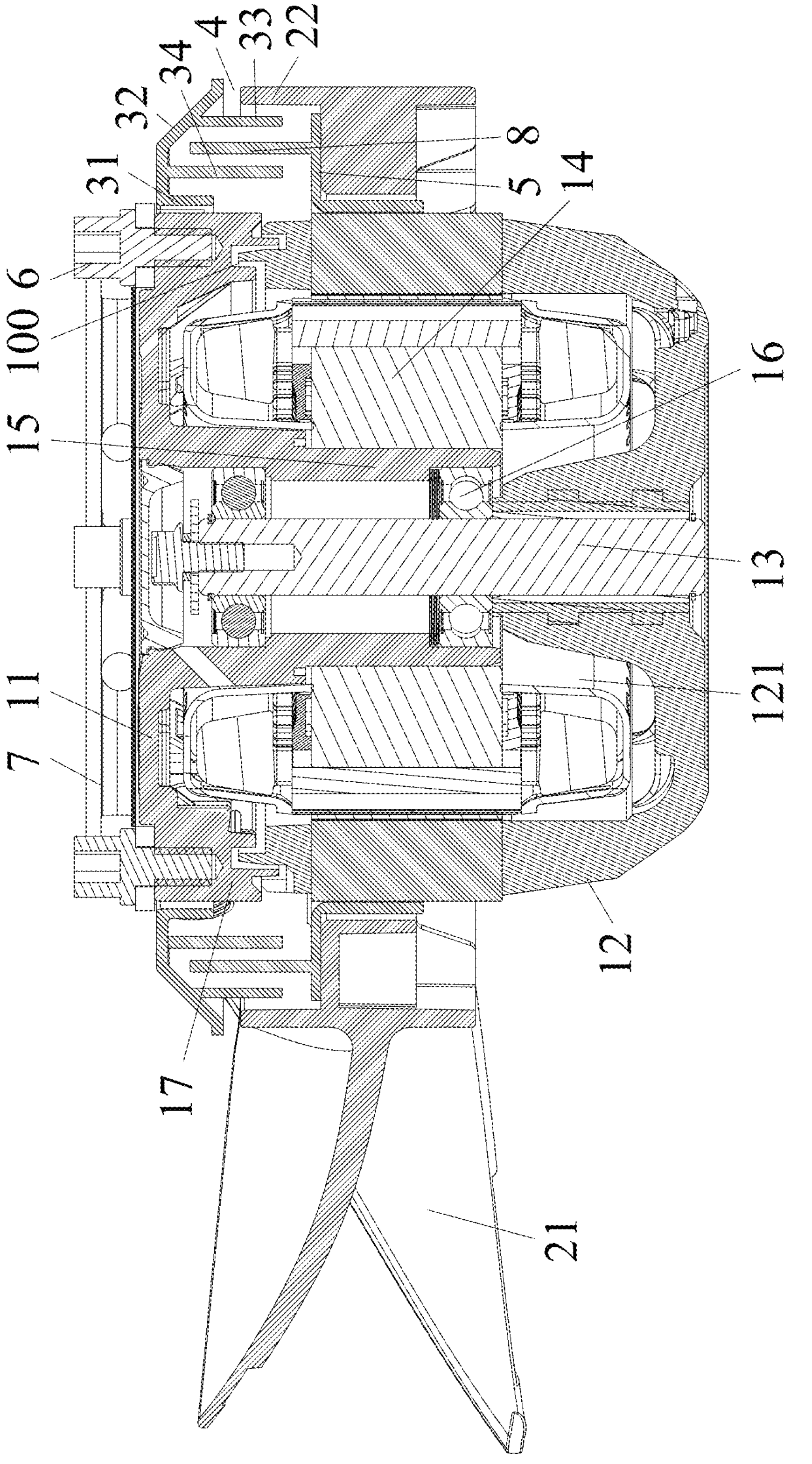
FIG. 10 is a structural cross-sectional view of an external rotor axial flow fan according to Example 4 of the disclosure.
Figure 11:
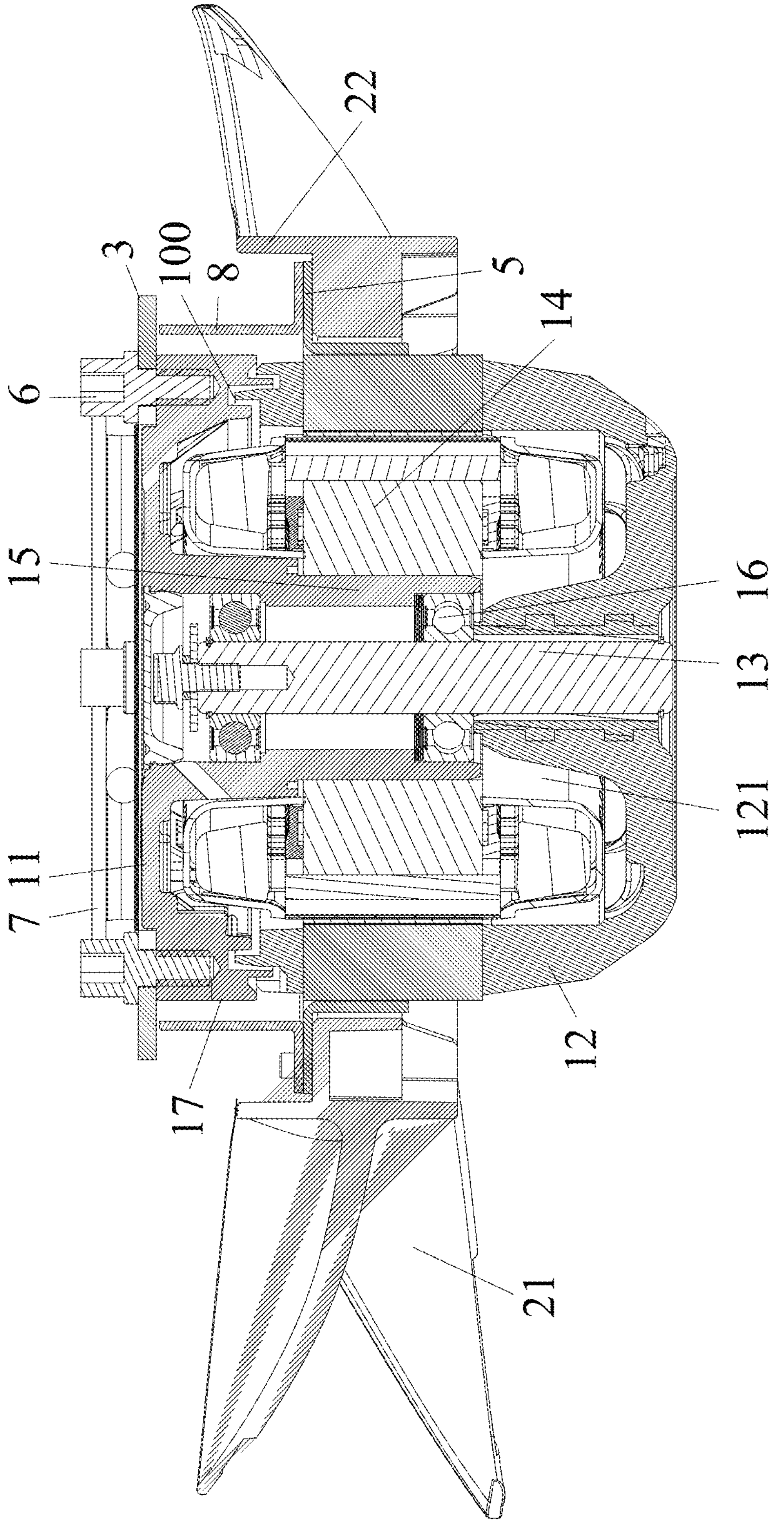
FIG. 11 is a structural cross-sectional view of an external rotor axial flow fan according to Example 5 of the disclosure.

As shown in FIG. 10, the present example is a modification based on Example 3. To improve the waterproof and dustproof rating, the baffle portion 32 further extends downward to form a second inner baffle 34. The first inner baffle 33 and the second inner baffle 34 are spaced apart from each other, with the second inner baffle 34 located radially inward of the first inner baffle 33. A top portion of the internal water baffle ring 8 is nested within a groove formed between the first inner baffle 33 and the second inner baffle 34.

Example 5

The example provides an axial flow fan, comprising an external rotor motor 1 and an impeller 2. The external rotor motor 1 comprises a base, an external rotor assembly 12, a rotating shaft 13, and a stator assembly 14; the base comprises a base plate 11 and a sleeve 15 protruding upward from a middle of a top surface of the base plate 11; bearing chambers are respectively disposed at both ends of the sleeve 15, and bearings 16 are disposed within the bearing chambers; the rotating shaft 13 is rotatably supported by the bearings 16, and a top end of the rotating shaft is connected to the external rotor assembly 12; the stator assembly 14 is disposed around the sleeve 15 and is disposed within an inner cavity 120 of the external rotor assembly 12; an annular protrusion 17 is disposed at an edge of the base plate 11; a labyrinth seal structure 100 is formed by a complementary engagement of convex and concave structures between the annular protrusion 17 and an end of the external rotor assembly 12; the impeller 2 comprises a plurality of blades 21 and a hub 22; the plurality of blades 21 are mounted on an outer side of the hub 22, and the hub 22 is mounted to an outer end of the external rotor assembly 12 via an installation bracket 5; an external water baffle ring 3 is disposed around the base; the installation bracket 5 is equipped with an internal water baffle ring 8; and the external water baffle ring 3 cooperates with the internal water baffle ring 8 to form a water blocking device around a periphery of the labyrinth seal structure 100. The top of the internal water baffle ring 8 is positioned adjacent to and below the external water baffle ring 3; and a gap is formed between a bottom surface of the external water baffle ring 3 and the top of the internal water baffle ring 8.

The cross-section of the internal water baffle ring 8 is L-shaped.

This structure achieves a waterproof and dustproof rating essentially equivalent to that of Example 1, while being structurally simpler.

Example 6

Figure 12:
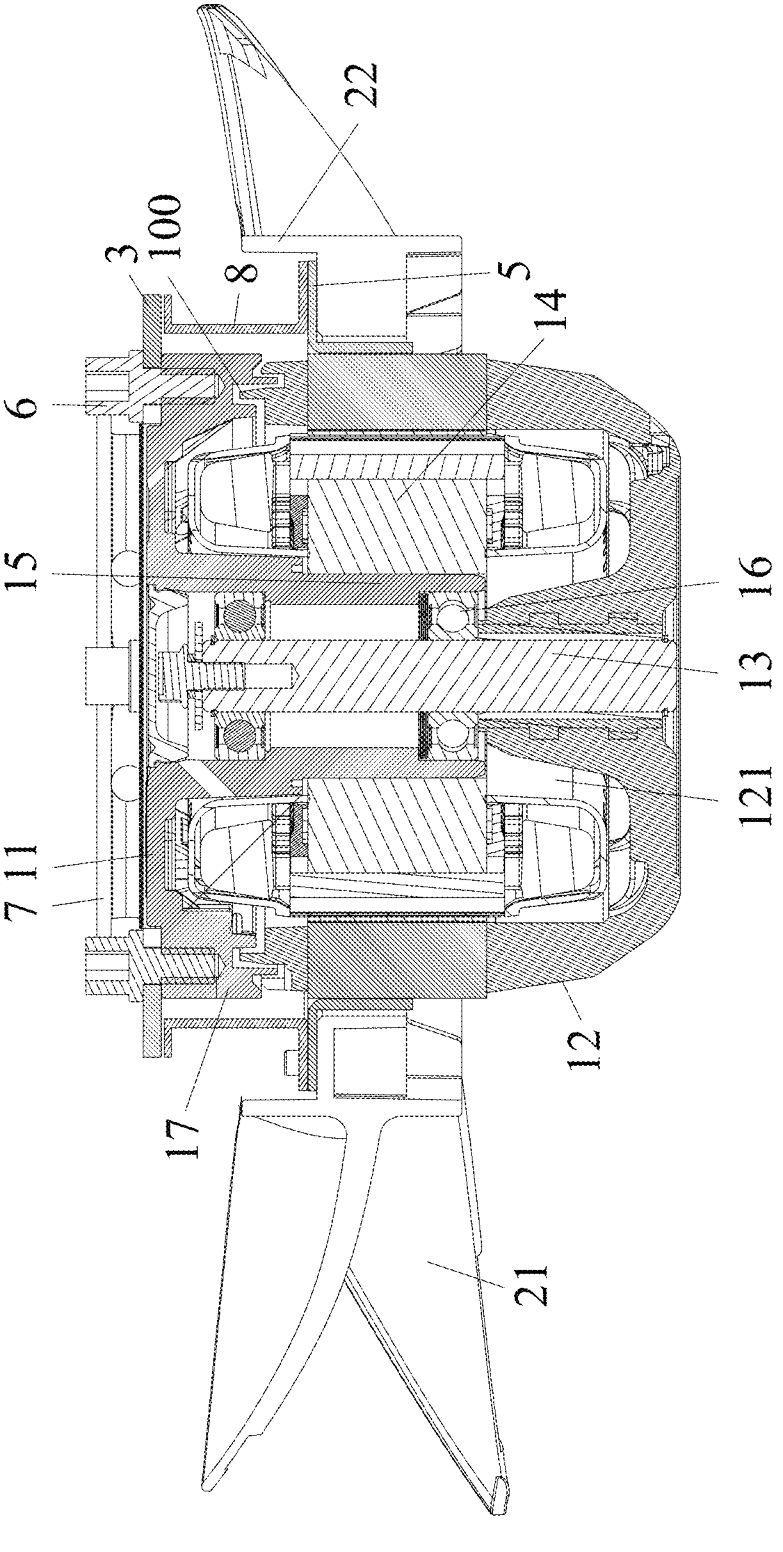
FIG. 12 is a structural cross-sectional view of an external rotor axial flow fan according to Example 6 of the disclosure.

As shown in FIG. 12, the present example is a modification based on Example 5. To improve the waterproof and dustproof rating, the cross-sectional shape of the internal water baffle ring 8 is altered to a U-shape.

It will be obvious to those skilled in the art that changes and modifications may be made, and therefore, the aim in the appended claims is to cover all such changes and modifications.

What is claimed is:

1. An axial flow fan, comprising:

an external rotor motor, the external rotor motor comprising a base, an external rotor assembly, a rotating shaft, and a stator assembly; and an impeller, the impeller comprising a plurality of blades and a hub, the plurality of blades being mounted on an outer side of the hub, and the hub being disposed around the external rotor assembly;

wherein:

the base comprises a base plate and a sleeve protruding upward from a middle of a top surface of the base plate;

bearing chambers are respectively disposed at both ends of the sleeve, and bearings are disposed within the bearing chambers;

the rotating shaft is rotatably supported by the bearings, and a top end of the rotating shaft is connected to the external rotor assembly;

the stator assembly is disposed around the sleeve and is disposed within an inner cavity of the external rotor assembly;

an annular protrusion is disposed at an edge of the base plate;

a labyrinth seal structure is formed by a complementary engagement of convex and concave structures between the annular protrusion and an end of the external rotor assembly;

an external water baffle ring is disposed around the base;

a periphery of the external water baffle ring is inclined and extends radially outward to a position above the hub; and the external water baffle ring cooperates with the hub to form a water blocking device around a periphery of the labyrinth seal structure.

2. The axial flow fan of claim 1, wherein the external water baffle ring comprises a mounting portion and a baffle portion; the mounting portion is disposed around the base; the baffle portion is connected to the mounting portion and extends radially to be positioned above the hub; an outer side of the baffle portion is inclined downward and forms a gap opening with a top outer edge of the hub; the baffle portion extends downward to form a first inner baffle, and the first inner baffle is adjacent to and shields the gap opening.

3. The axial flow fan of claim 2, wherein the hub is mounted to an outer end of the external rotor assembly via an installation bracket; the installation bracket is equipped with an internal water baffle ring; and the internal water baffle ring is located radially inward of the first inner baffle.

4. The axial flow fan of claim 3, wherein the baffle portion further extends downward to form a second inner baffle; the first inner baffle and the second inner baffle are spaced apart from each other; the second inner baffle is located radially inward of the first inner baffle; and a top portion of the internal water baffle ring is nested within a groove formed between the first inner baffle and the second inner baffle.

5. The axial flow fan of claim 3, wherein a cross-section of the internal water baffle ring is U-shaped, I-shaped, L-shaped, or J-shaped.

6. The axial flow fan of claim 5, wherein an outer diameter of the baffle portion is slightly greater than an outer diameter of the hub.

7. The axial flow fan of claim 5, wherein the annular protrusion comprises a first groove and a first boss; the end of the external rotor assembly comprises a second groove and a second boss; the first boss is engaged in the second groove, and the second boss is engaged in the first groove, thereby forming the labyrinth seal structure.

8. The axial flow fan of claim 5, wherein the base is disposed on a protective grill by a plurality of screws.

9. The axial flow fan of claim 1, wherein an outer diameter of the baffle portion is slightly greater than an outer diameter of the hub.

10. The axial flow fan of claim 1, wherein the annular protrusion comprises a first groove and a first boss; the end of the external rotor assembly comprises a second groove and a second boss; the first boss is engaged in the second groove, and the second boss is engaged in the first groove, thereby forming the labyrinth seal structure.

11. The axial flow fan of claim 1, wherein the base is disposed on a protective grill by a plurality of screws.

12. An axial flow fan, comprising an external rotor motor and an impeller, wherein, the external rotor motor comprises a base, an external rotor assembly, a rotating shaft, and a stator assembly;

the base comprises a base plate and a sleeve protruding upward from a middle of a top surface of the base plate;

bearing chambers are respectively disposed at both ends of the sleeve, and bearings are disposed within the bearing chambers;

the rotating shaft is rotatably supported by the bearings, and a top end of the rotating shaft is connected to the external rotor assembly;

the stator assembly is disposed around the sleeve and is disposed within an inner cavity of the external rotor assembly;

an annular protrusion is disposed at an edge of the base plate;

a labyrinth seal structure is formed by a complementary engagement of convex and concave structures between the annular protrusion and an end of the external rotor assembly;

the impeller comprises a plurality of blades and a hub; the plurality of blades are mounted on an outer side of the hub, and the hub is mounted to an outer end of the external rotor assembly via an installation bracket;

an external water baffle ring is disposed around the base;

the installation bracket is equipped with an internal water baffle ring; and the external water baffle ring cooperates with the internal water baffle ring to form a water blocking device around a periphery of the labyrinth seal structure.

13. The axial flow fan of claim 12, wherein a top of the internal water baffle ring is positioned adjacent to and below the external water baffle ring; and a gap is formed between a bottom surface of the external water baffle ring and the top of the internal water baffle ring.

14. The axial flow fan of claim 13, wherein a cross-section of the internal water baffle ring is U-shaped or L-shaped; and a cross-section of the external water baffle ring is rectangular.

* * * * *